United States Patent

Choi

[11] Patent Number: 6,097,689
[45] Date of Patent: Aug. 1, 2000

[54] OPTICAL PICKUP SYSTEM INCORPORATED THEREIN A POLARIZING FILM AND A PAIR OF ¼ WAVELENGTH PLATES

[75] Inventor: Yang-Oh Choi, Seoul, Rep. of Korea

[73] Assignee: Daewoo Electronics Co., Ltd, Rep. of Korea

[21] Appl. No.: 08/898,161

[22] Filed: Jul. 22, 1997

[30] Foreign Application Priority Data

Jul. 31, 1996 [KR] Rep. of Korea ............... 96-31954
Jul. 31, 1996 [KR] Rep. of Korea ............... 96-31967

[51] Int. Cl.[7] .................................................. G11B 7/00
[52] U.S. Cl. ................. 369/112; 369/44.23; 369/110
[58] Field of Search ............................ 369/44.23, 110, 369/112

[56] References Cited

U.S. PATENT DOCUMENTS

| | | | |
|---|---|---|---|
| 5,383,173 | 1/1995 | Kim et al. ........................ | 369/112 |
| 5,396,061 | 3/1995 | Taniguchi et al. ................ | 369/112 X |
| 5,511,060 | 4/1996 | Jau-Jiu et al. ................... | 369/112 X |
| 5,555,538 | 9/1996 | Yanagawa et al. ............... | 369/110 |
| 5,561,655 | 10/1996 | Gage et al. . | |

FOREIGN PATENT DOCUMENTS

| | | |
|---|---|---|
| 0593370 | 4/1994 | European Pat. Off. . |
| 0661698 | 7/1995 | European Pat. Off. . |
| 0671732 | 9/1995 | European Pat. Off. . |

*Primary Examiner*—W. R. Young
*Attorney, Agent, or Firm*—Anderson Kill & Olick

[57] ABSTRACT

An optical pickup system reproduces an information signal stored on an optical disk including a recording surface. The optical pickup system comprises an objective lens for focusing a light beam, having a P and an S polarizing components, on the recording surface, a first prism provided with an inclined and a side surfaces and a second prism provided with a side surface, wherein the second prism includes a light source for generating the light beam, a first detector and a first and a second ¼ λ plates, and a first prism includes a second detector and a polarizing film for transmitting only the P-polarizing component of the light beam to the recording surface. In the optical system, the first detector attached at the side surface of the second prism facing the second ¼ λ plate from outside, for receiving a part of the light beam impinging thereon and reflecting the remaining part of the light beam to the direction of the second ¼ λ plate, and the second detector fixed at the side surface opposite the first detector with respect to the center of the inclined surface of the first prism, for receiving the remaining part of the light beam.

10 Claims, 4 Drawing Sheets

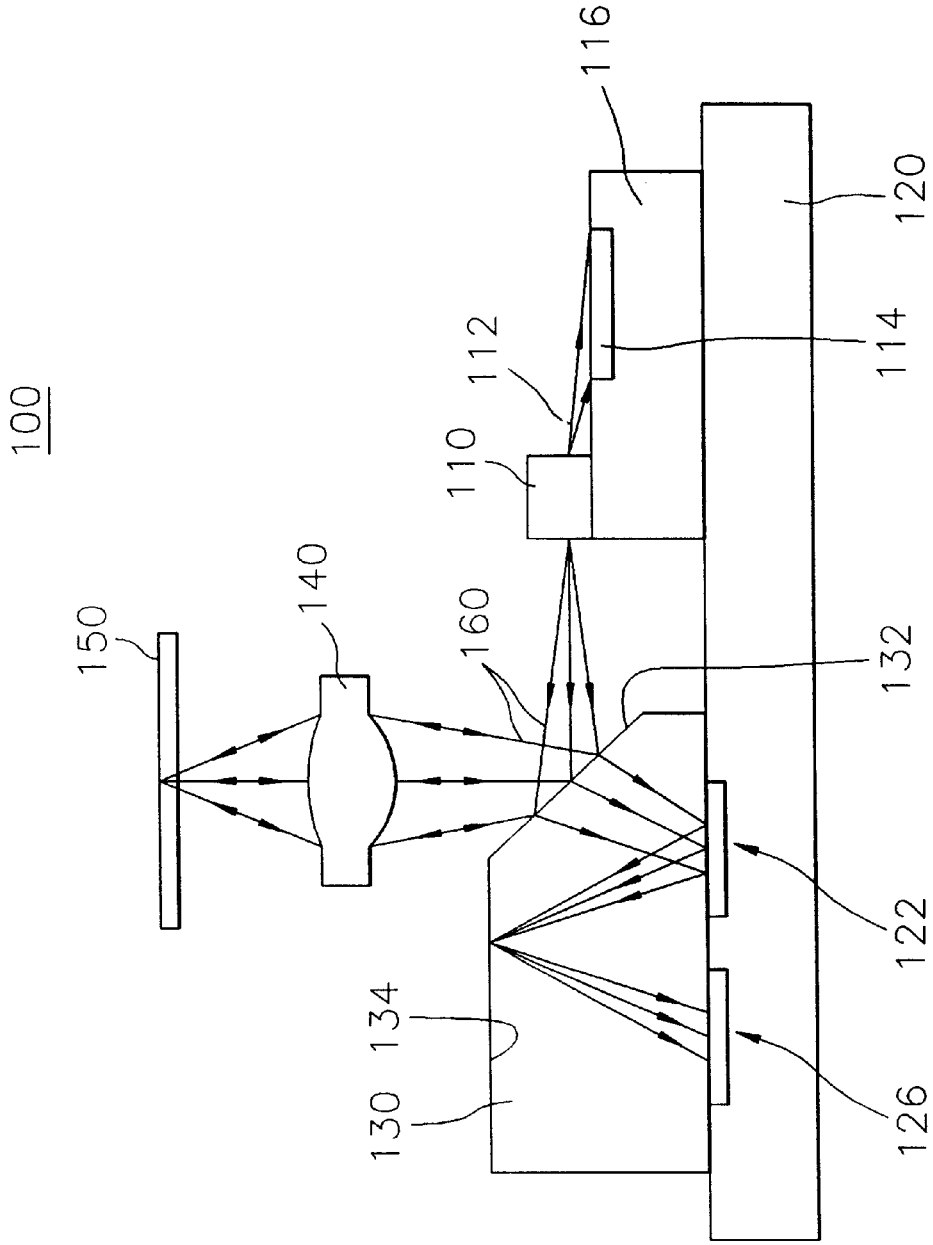

OPTICAL PICKUP SYSTEM INCORPORATED THEREIN A POLARIZING FILM AND A PAIR OF ¼ WAVELENGTH PLATES

FIELD OF THE INVENTION

The present invention relates to an optical pickup system; and, more particularly, to an improved optical pickup system capable of providing an increased optical efficiency thereof.

DESCRIPTION OF THE PRIOR ART

As is well known, main difficulties associated with an optical pickup system for reading information recorded on an optical disk, e.g., a digital audio disk or a compact disk, are caused due to errors in focusing light beams and a beam size method has been introduced to solve the problem.

In FIG. 1A, there is shown a prior art optical pickup system 100 utilizing the beam size method, as disclosed in U.S. Pat. No. 5,396,061, entitled "OPTO-MAGNETIC RECORDING POLARIZATION OPTICAL APPARATUS HAVING A LIGHT ABSORPTION FILM AND A TOTAL REFLECTION FILM", the optical pickup system 100 including: a pair of photodiodes 122, 126 formed on a silicone substrate 120, a prism 130 provided with a first and a second surface 132, 134 fixed on top of the photodiodes 122, 126 by using an adhesive, a light source 110 formed on top of a submount 116 whose bottom surface is secured to the silicone substrate 120 by soldering or the like, for generating a light beam, and an objective lens 140.

In the optical pickup system 100, a part of a light beam 160 emitted from the light source 110 is first partially reflected from the first surface 132 of the prism 130, wherein the reflected part of the light beam 160 is transmitted through the objective lens 140 thereafter, and then is focused on the optical disk 150 to reproduce data recorded on the optical disk 150 by using the optical pickup system 100. The part of the light beam 160 which is reflected from the optical disk 150 is transmitted through the objective lens 140 to the first surface 132 of the prism 130 and is partially refracted into the prism 130. A part of the refracted light beam 160 which enters into the prism 130 is absorbed by the photodiode 122, and the rest of the light beam 160 is reflected from the photodiode 122 and then is totally reflected internally from the second surface 134 of the prism 130, and falls on the photodiode 126. The ratio of the reflected part to the refracted part of the light beam is usually required to be 50:50 to achieve a maximum optical efficiency.

The photodiode 122, as shown in FIG. 1B, includes three parts 123, 124, 125, and the photodiode 126, as shown in FIG. 1C, also includes three parts 127, 128, 129, wherein each of the parts of the photodiodes is capable of measuring the intensity of a light beam impinging thereonto. A focusing error signal is obtained by subtracting the sum of the intensities on the parts 124, 127 and 129 from the sum of the intensities on the parts 123, 125 and 128.

In such a system, the total intensity i of the light beam 160 impinging on each of the parts of the photodiodes 122, 126, may be determined as:

$$i = rI * R_S^2 * R_O^2$$

wherein I represents the intensity of the ligth beam emitted from the light source 110, r, the radiation loss factor, $R_S$, the loss factor of the first surface 132 of the prism 130, and $R_O$, the loss factor of the objective lens 140. If r, I, $R_S$ and $R_O$ are 0.8, 0.3, 0.5 and 0.97, respectively, then i becomes 0.056 mW. In this optical pickup system 100, half of the light beam 160 is obstructed by the first surface 132 of the prism 130, thereby reducing the optical efficiency thereof.

There are certain deficiencies associated with the assembly of the prior optical system. Since the prism is mounted on the silicone substrate after the photodiodes are formed on top of the silicone substrate, if the light source is not aligned accurately with the focal point of the objective lens and the photodiodes, it is not easy to correct the alignment.

SUMMARY OF THE INVENTION

It is, therefore, a primary object of the present invention to provide an optical pickup system capable of increasing the optical efficiency thereof by utilizing a beam size method.

It is another object of the present invention to provide an optical pickup system having a simpler alignment process and structure thereof for reading information recorded on a recording surface of an optical disk.

In accordance with the present invention, there is provided an optical pickup system for reproducing an information signal stored on an optical disk including a recording surface, the optical pickup system comprising: a light source for generating a light beam including a P and an S polarization components; an objective lens for focusing the light beam on the recording surface of the optical disk; a polarizing film for transmitting one of the polarization components of the light beam to the recording surface of the optical disk, wherein the center point of the polarizing film is placed at an optical axis formed by a central point of the light source and a focal point of the objective lens; a first ¼ λ plate for modulating the polarization component of the light beam reflected from the recording surface of the optical disk, thereby the modulated light beam being reflected by the polarizing film; a second ¼ λ plate for changing the polarization component of the modulated light beam to thereby the changed light beam pass through the polarizing film; and a detector for detecting the light beam reflected from the recording surface of the optical disk, wherein the detector is provided with a first and a second optical detectors, each being placed opposite from the other with respect to the center point of the polarizing film.

BRIEF DESCRIPTION OF THE DRAWINGS

The present invention together with the above and other objects and advantages will become apparent from the following description of preferred embodiments, when read in conjunction with the accompanying drawings, wherein:

FIG. 1A represents a schematic side view of a prior art optical pickup system.

DETAILED DESCRIPTION OF THE PREFERRED EMBODIMENTS

Figure 1B:
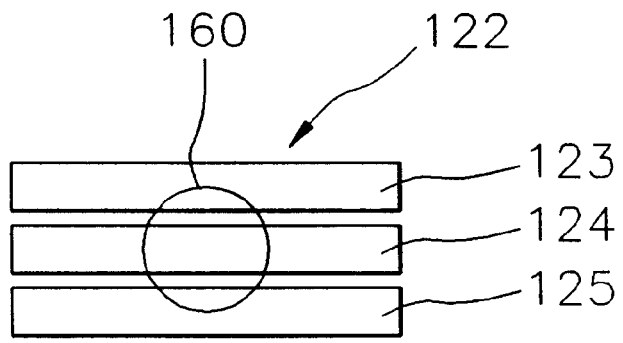
FIGS. 1B and 1C are plan views illustrating conventional structures of photodiodes shown in FIG. 1A.
Figure 1C:
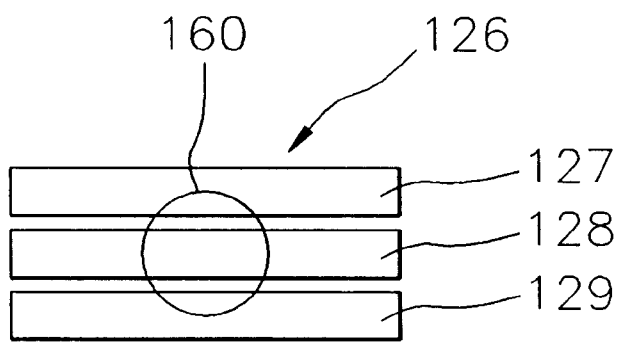
Figure 2:
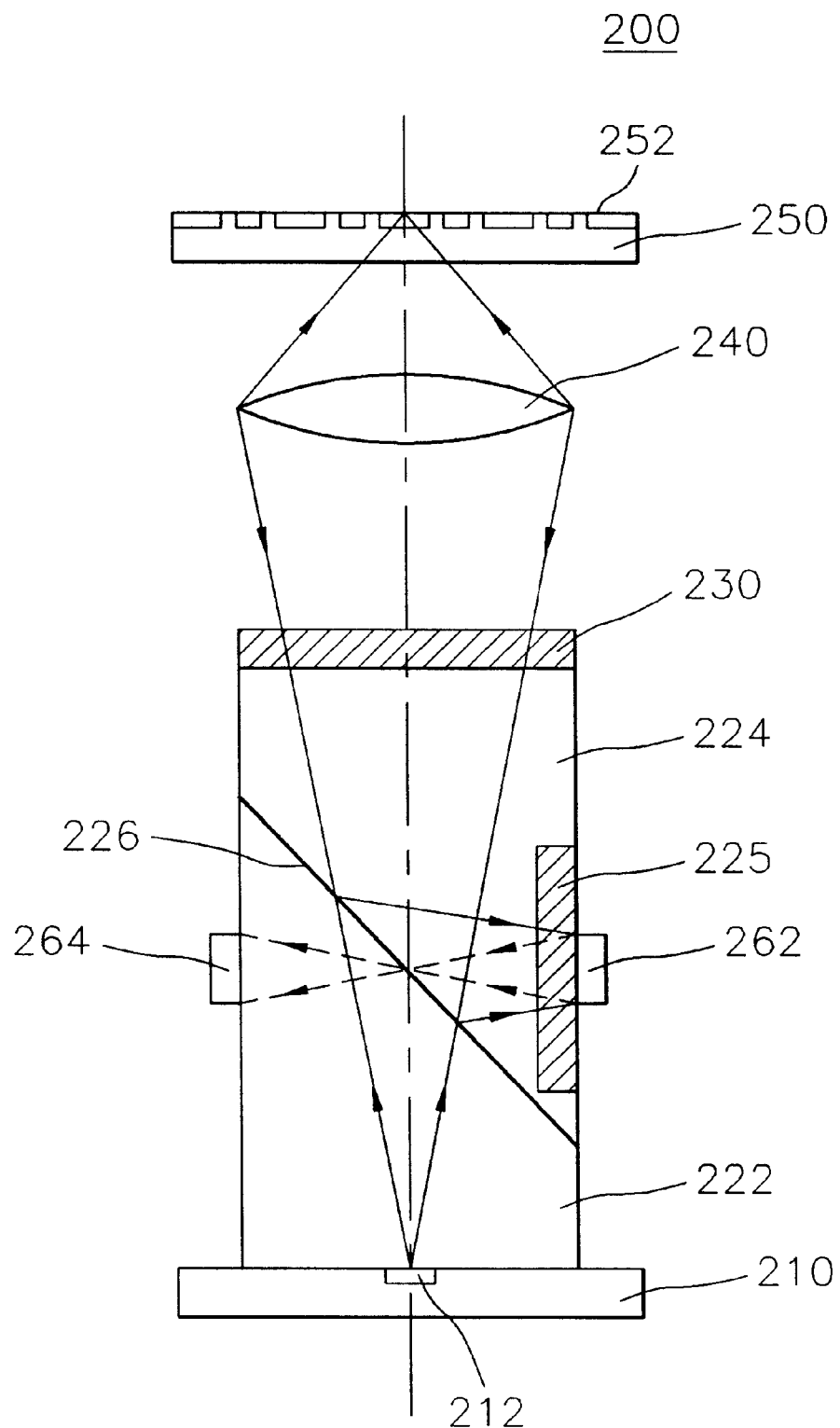
FIG. 2 exhibits a schematic side view of an optical pickup system in accordance with the present invention.

There are illustrated in FIGS. 2 and 3 various views of the inventive optical pickup system and beam spots on the detecting surface in accordance with a preferred embodiment of the present invention.

As shown in FIG. 2, the optical pickup system 200 includes a light source 212 integrated on top of a silicon substrate 210, for generating a light beam, a first ¼ λ plate 230, an objective lens 240, a first and a second prisms 222, 224, wherein the first prism and the second prisms 222, 224 may be produced, e.g., by cutting a prism with an inclined surface passing through the mid-point of the prism in such a manner that each of the cut parts will provide a trapezoidal side view, the first and the second prisms 222, 224 being the bottom and the top cut parts of the prism, respectively, a polarizing film 226 formed between the inclined surfaces of the prisms, a second ¼ λ plate 225, a first and a second optical detectors 262, 264.

In the system 200, the light beam emitted from the light source 212, e.g., a laser diode, enters the polarizing film 226, wherein the light beam includes a P and an S-polarized light components. The polarizing film 226 transmits only the P-polarized light component and reflects the S-polarized light component. The bottom surface of the first prism 222 is fixed on top of the light source 212 and the silicone substrate 210. The inclined surfaces of the first and second prisms 222, 224 are bonded to the polarizing film 226 by soldering or the like. The P-polarized light beam passed through the polarizing film 226 impinges onto the first ¼ λ plate 230 and transmits therethrough, wherein the first ¼ λ plate 230 is mounted on the top surface of the second prism 224. The P-polarized light beam is focused on the recording surface 252 of the optical disk 250 by the objective lens 240. The P-polarized light beam reflected from the recording surface 252 of the optical disk 250 is first converged by the objective lens 240, is transmitted through the first ¼ λ plate 230 thereafter, thereby converting the P-polarized light beam into an S-polarized light beam, and then the S-polarized light beam falls on the polarizing film 226.

The S-polarized light beam is totally reflected from the polarizing film 226 to the first optical detector 262 through the second ¼ λ plate 225, wherein the polarizing film 226 is arranged in such a way that it is inclined at a predetermined angle with respect to an optical axis formed by the central point of the light source 212 and a focal point of the objective lens 240. It is preferable that the predetermined angle is 45 degrees. The second ¼ λ plate 225 is integrated inside a side surface of the second prism 224 and the first optical detector 262 is attached at outside of the second ¼ λ plate 225. The distance between the first optical detector 262 and the center point of the polarizing film 226 is a half of the distance between the central point of the light source 212 and the center point of the polarizing film 226.

After the S-polarized light beam passes through the second ¼ λ plate 225, a part of the S-polarized light beam enters into the reception surface of the first optical detector 262, wherein the part of the S-polarized light beam used for reading information signals recorded on the recording surface 252 of the optical disk 250, whereas the remaining part of the S-polarized light beam is first reflected from the reception surface of the first optical detector 262 to the second ¼ λ plate 225, is converted into a P-polarized light beam after being transmitted through the second ¼ λ plate 225 and then travels to the polarizing film 226, the P-polarized light beam is represented in a dotted line in FIG. 2.

The P-polarized light beam emerging from the second ¼ λ plate 225 is totally transmitted through the polarizing film 226 and impinges onto the second optical detector 264. The second optical detector 264 is oppositely located to the first optical detector 262 with respect to the center point of the polarizing film 226. The distance between the first optical detector 262 and the center point of the polarizing film 226 is equal to the distance between the second optical detector 264 and the center point of the polarizing film 226.

Figure 3A:
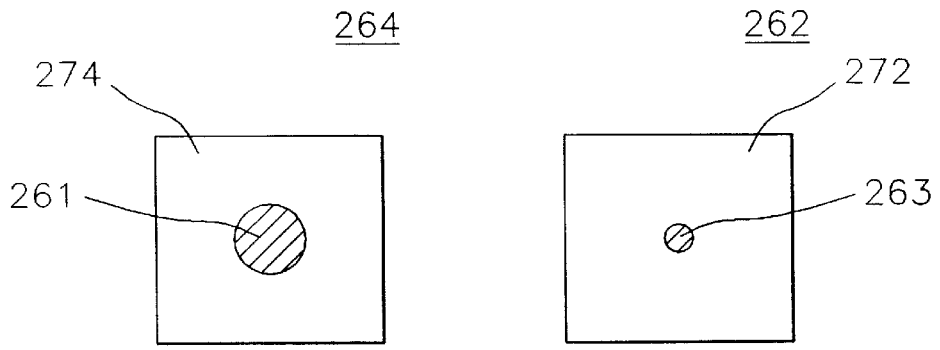
FIGS. 3A to 3C exemplify beam spots impinging onto the reception surface of the detector.

When the optical disk 250 moves further away from the light source 212 beyond the focal point of the objective lens 240, the light beam intensity distributions 263, 261 on the reception surfaces 272, 274 of the first and second optical detectors 262, 264, respectively, form circular images as shown in FIG. 3A, the radius of the circular image on the reception surface 274 of the second optical detector 264 being larger than the radius of the circular image on the reception surface 272 of the first optical detector 262. Since the beam intensity increases as the radius of the circle increases, the beam intensity 261 on the reception surface 274 becomes larger than that on the reception surface 272. A focusing error signal is obtained by subtracting the intensity 263 on the reception surface 272 from the intensity 261 on the reception surface 274, thereby allowing a signal detection unit(not shown) to generate the focusing error signal whose magnitude is a positive value representing the subtraction result obtained above.

Figure 3B:
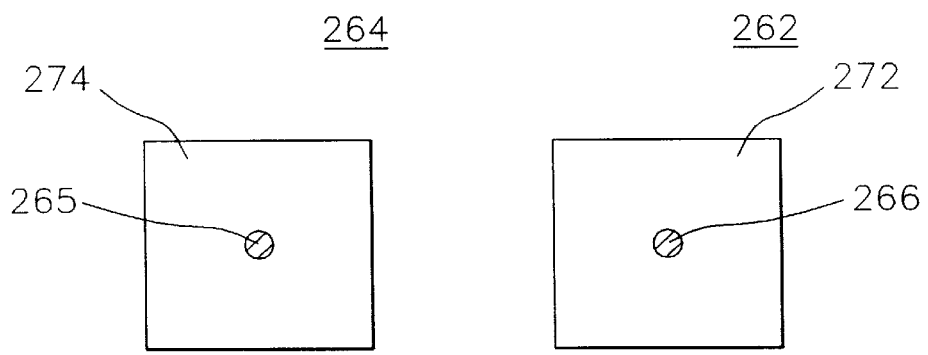

FIG. 3B shows the light beam intensities 265, 266 on the reception surfaces 274, 272 of the second and the first optical detectors 264, 262 when the optical disk 250 is placed at the focal position of the objective lens 240. The beam intensities on the reception surfaces 272, 274 are equal to each other, and the signal detection unit(not shown) generates the focusing error signal of zero magnitude.

Figure 3C:
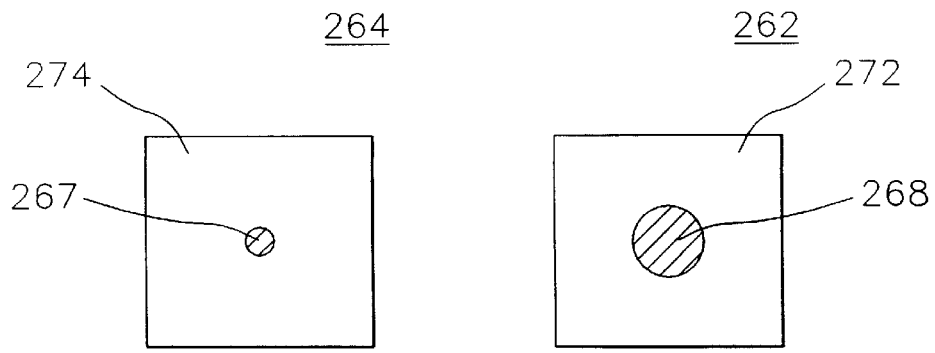

In case when the optical disk 250 moves closer to the objective lens 240 from the focal position of the objective lens 240, the light beam intensity distributions 267, 268 form circular images on the reception surfaces 274, 272 of the second and the first optical detectors 264, 262, respectively, as illustrated in FIG. 3C. The beam intensity 267 on the reception surface 274 are smaller than that on the reception surface 272, and the signal detection unit generates the focusing error signal whose magnitude is a negative value representing the subtraction result obtained above.

In the system 200, the total intensity i of the light beam impinging on reception surfaces of the first and the second optical detector 262, 264 may be calculated by using the following relationship:

$$i = rI * T * R_o^2$$

wherein, I represents the intensity of the light beam emitted from the light source, r, the radiation loss factor, T, the loss factor of the polarizing film, $R_O$, the loss factor of the objective lens. If the r, I, T and $R_O$ are 0.8, 0.3, 0.5 and 0.97, respectively, then i is 0.112 mW. The intensity of the light beam impinging on the reception surfaces of the present invention is, therefore, 2 times larger than that of the prior art.

In comparison with the prior art optical pickup system 100, the inventive optical pickup system 200 has a simpler alignment process and structure and transmits the light beam more efficiently than the conventional optical pickup system 100, thereby improving the optical efficiency thereof. This is achieved by incorporating therein a polarizing film 226, a first and a second ¼ λ plate 230, 225, thereby reducing the loss factor of the first surface 132 of the prism 130 in the prior art optical pickup system 100, which will, in turn, improve the overall optical efficiency of the optical pickup system 200. Further, since the optical detectors 262, 264 are attached to the side surfaces of the prisms 222, 224, the alignment of the inventive optical pickup system 200 is easier than that of the prior art optical pickup system 100.

While the present invention has been described with respect to the preferred embodiments, other modifications and variations may be made without departing from the spirit and scope of the present invention as set forth in the following claims.

What is claimed is:

1. An optical pickup system for reproducing an information signal stored on an optical disk including a recording surface, the optical pickup system comprising:

means for generating a light beam including a P and an S polarization components;

means for focusing the light beam on the recording surface of the optical disk;

means for transmitting one of the polarization components of the light beam to the recording surface of the optical disk, wherein the center point of the transmitting means is placed at an optical axis formed by a central point of the generating means and a focal point of the focusing means;

a first optical device for changing the polarization component of the light beam reflected from the recording surface of the optical disk, thereby the changed light beam being reflected by the transmitting means;

a second optical device for changing the polarization component of the changed reflected light beam to thereby cause the changed reflected light beam pass through the transmitting means; and means for detecting the light beam reflected from the recording surface of the optical disk, wherein the detecting means is provided with a first and a second optical detectors, each being placed opposite from the other with respect to the center point of the transmitting means.

2. The optical pickup system of claim 1, wherein the transmitting means is inclined at a predetermined angle with respect to the optical axis.

3. The optical pickup system of claim 2, wherein the predetermined angle is 45 degrees.

4. The optical pickup system of claim 3, wherein a distance between the first optical detector and the center point of the transmitting means is equal to a distance between the second optical detector and the center point of the transmitting means.

5. The optical pickup system of claim 4, wherein the distance between the first optical detector and the center point of the transmitting means is a half of the distance between the center point of the generating means and the center point of the transmitting means.

6. The optical pickup system of claim 5, wherein the first optical device is disposed between the transmitting means and the focusing means.

7. The optical pickup system of claim 6, wherein the second optical device is disposed between the transmitting means and the first optical detector.

8. The optical pickup system of claim 6, wherein the first optical detector receives a part of the changed light beam and reflects the remaining part thereof to the second optical detector.

9. An optical pickup system for reproducing an information signal stored on an optical disk including a recording surface, the optical pickup system comprising:

a light source integrated on top of a substrate, for generating a light beam including a P and an S polarization components;

a first prism provided with a bottom and an inclined top surface, wherein the bottom surface of the prism is mounted on top of the light source and the substrate, the inclined surface of the first prism is capable of transmitting only one of the polarization components of the light beam;

a second prism provided with a top and an inclined surface, wherein the inclined surface of the second prism is fixed on the inclined surface of the first prism;

a first ¼ λ plate mounted on the top surface of the second prism, for changing the polarization component of the light beam transmitted therethrough;

an objective lens for focusing the light beam transmitted through the first ¼ λ plate on the recording surface of the optical disk and converging the light beam reflected from the recording surface of the optical disk toward the inclined surface of the first prism;

a second ¼ λ plate integrated inside a side surface of the second prism, for changing the polarization component of the light beam reflected from the inclined surface of the first prism;

a first detector attached at the side surface of the second prism facing the second ¼ λ plate from outside, for receiving a part of the light beam impinging thereon and reflecting the remaining part of the light beam to the direction of the second ¼ λ plate; and a second detector fixed at the side surface opposite the first detector with respect to a center of the inclined surface of the first prism, for receiving the remaining part of the light beam.

10. The optical pickup system of claim 9, wherein the inclined surface of the first prism is inclined at a predetermined angle with respect to an optical axis formed by a center point of the light source and a focal point of the objective lens.

* * * * *